US012563428B2

(12) United States Patent (10) Patent No.: US 12,563,428 B2
Hong (45) Date of Patent: Feb. 24, 2026

(54) METHOD FOR SHARING MEASUREMENT GAP

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 304 days.

(21) Appl. No.: 18/258,535

(22) PCT Filed: Dec. 21, 2020

(86) PCT No.: PCT/CN2020/138134
§ 371 (c)(1),
(2) Date: Jun. 20, 2023

(87) PCT Pub. No.: WO2022/133688
PCT Pub. Date: Jun. 30, 2022

(65) Prior Publication Data
US 2024/0056848 A1 Feb. 15, 2024

(51) Int. Cl.
*H04W 24/08* (2009.01)
(52) U.S. Cl.
CPC .................................. *H04W 24/08* (2013.01)
(58) Field of Classification Search
CPC .................................................... H04W 24/08
USPC ........................................................ 370/252
See application file for complete search history.

(56) References Cited

U.S. PATENT DOCUMENTS

| | | | |
|---|---|---|---|
| 2011/0009117 A1 | 1/2011 | Breuer et al. | |
| 2019/0253906 A1 | 8/2019 | Lin | |
| 2019/0306734 A1 | 10/2019 | Huang et al. | |
| 2020/0296612 A1 | 9/2020 | Ma et al. | |
| 2021/0014751 A1* | 1/2021 | Callender | H04W 72/0446 |
| 2022/0377755 A1* | 11/2022 | Cui | H04L 5/0064 |
| 2023/0047684 A1* | 2/2023 | Hu | H04W 24/02 |
| 2024/0031848 A1* | 1/2024 | Cui | H04W 76/30 |
| 2024/0056860 A1* | 2/2024 | Chen | H04W 76/28 |

FOREIGN PATENT DOCUMENTS

| | | |
|---|---|---|
| CN | 111247852 A | 6/2020 |
| CN | 111316694 A | 6/2020 |
| CN | 111630918 A | 9/2020 |
| CN | 111866925 A | 10/2020 |

(Continued)

OTHER PUBLICATIONS

"Introduce a new measurement triggering mechanism and interference reporting prohibit timer for UAV," Proceedings of the 3GPP TSG-RAN2 Meeting #101bis, NTT Docomo, Inc., R2-1806416, Apr. 16, 2018, Sanya, China, 32 pages.

(Continued)

*Primary Examiner* — Nicholas R Taylor
*Assistant Examiner* — Chong G Kim
(74) *Attorney, Agent, or Firm* — McCoy Russell LLP

(57) ABSTRACT

A method for sharing a measurement gap includes: when a first resource window corresponding to a first measurement mode and a second resource window corresponding to a second measurement mode overlap, performing a mobility measurement on a target frequency point with a target measurement mode, according to a measurement gap sharing mechanism.

9 Claims, 3 Drawing Sheets

(56) References Cited

FOREIGN PATENT DOCUMENTS

| | | | |
|---|---|---|---|
| CN | 111972010 | A | 11/2020 |
| CN | 112040523 | A | 12/2020 |

OTHER PUBLICATIONS

"Further aspects of measurement gap design for NR. Multiple layers," Proceedings of the 3GPP TSG-RAN WG4 Meeting #86bis, Ericsson, R4-103787, Mar. 16, 2018, Melbourne, Australia, 13 pages.
"Discussion on Gap Sharing for UE Measurements in NE-DC," Proceedings of the 3GPP TSG-RAN WG4 Meeting #90b, Samsung, R4-1903354, Apr. 8, 2019, Xi'an, China, 4 pages.

\* cited by examiner

Perform, on the basis of a measurement gap sharing
mechanism, mobility measurement on a target frequency point
with a target measurement mode in response to overlap of
resource windows corresponding to all measurement modes

S101

SSB          CSI-RS          SSB

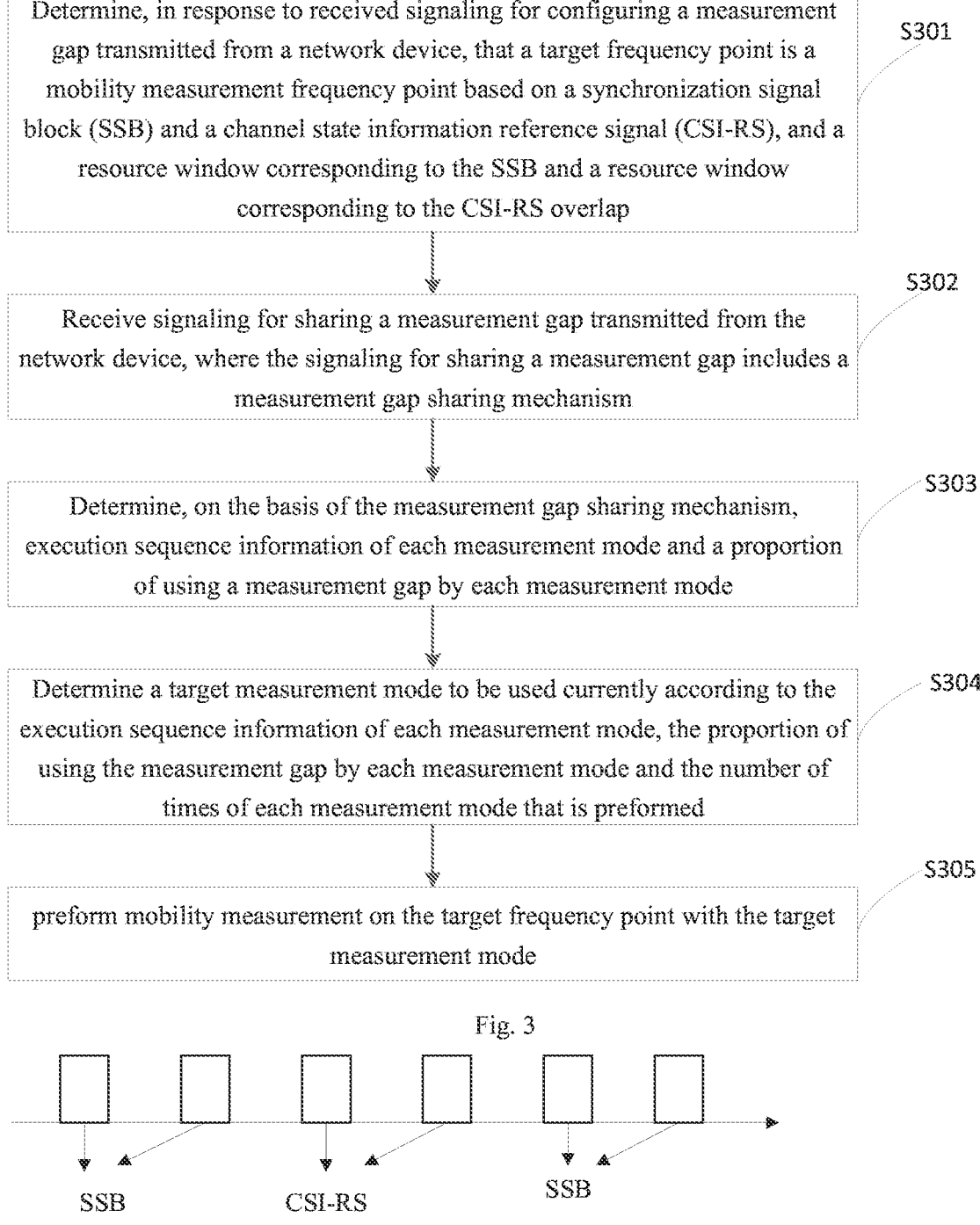

Determine, in response to received signaling for configuring a measurement gap transmitted from a network device, that a target frequency point is a mobility measurement frequency point based on a synchronization signal block (SSB) and a channel state information reference signal (CSI-RS), and a resource window corresponding to the SSB and a resource window corresponding to the CSI-RS overlap     S301

Receive signaling for sharing a measurement gap transmitted from the network device, where the signaling for sharing a measurement gap includes a measurement gap sharing mechanism     S302

Determine, on the basis of the measurement gap sharing mechanism, execution sequence information of each measurement mode and a proportion of using a measurement gap by each measurement mode     S303

Determine a target measurement mode to be used currently according to the execution sequence information of each measurement mode, the proportion of using the measurement gap by each measurement mode and the number of times of each measurement mode that is preformed     S304 preform mobility measurement on the target frequency point with the target measurement mode     S305

Fig. 3

SSB          CSI-RS          SSB

Fig. 4

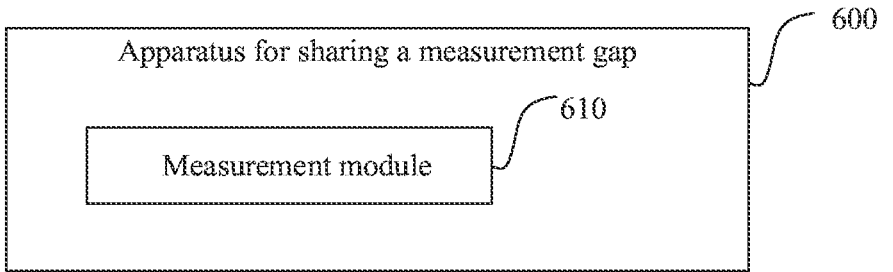

Transmit a measurement gap sharing mechanism to user equipment (UE), where the measurement gap sharing mechanism is configured to indicate a method for sharing a measurement gap between all measurement modes when the UE measures a target frequency point

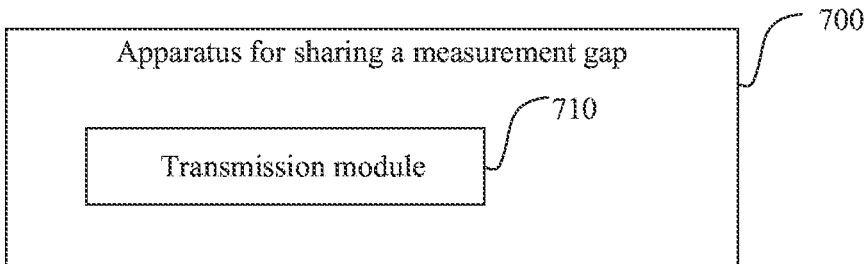

Apparatus for sharing a measurement gap — 600

Measurement module — 610

Fig. 6

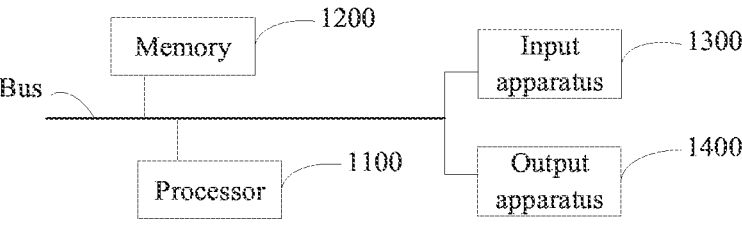

Apparatus for sharing a measurement gap — 700

Transmission module — 710

Fig. 7

Memory — 1200

Input apparatus — 1300

Bus

Processor — 1100

Output apparatus — 1400

Fig. 8

METHOD FOR SHARING MEASUREMENT GAP

CROSS REFERENCE TO RELATED APPLICATION

The present application is a U.S. National Phase of International Application No. PCT/CN2020/138134 entitled "METHOD AND APPARATUS FOR SHARING MEASUREMENT GAP," and filed on Dec. 21, 2020. The entire contents of the above-listed application are hereby incorporated by reference for all purposes.

BACKGROUND

After connected with a communication network, user equipment (UE) still has to constantly search for and measure radio channel quality of neighboring cells. In this way, handover can be made at an appropriate time.

SUMMARY

An example of a first aspect of the disclosure provides a method for sharing a measurement gap. The method is performed by user equipment (UE) and includes: performing, on the basis of a measurement gap sharing mechanism, mobility measurement on a target frequency point with a target measurement mode in response to overlap of resource windows corresponding to all measurement modes.

An example of a second aspect of the disclosure provides a method for sharing a measurement gap. The method is performed by a network device and includes:

transmitting a measurement gap sharing mechanism to user equipment (UE), where the measurement gap sharing mechanism is configured to indicate the method for sharing a measurement gap between all measurement modes when the UE measures a target frequency point.

An example of a third aspect of the disclosure provides a communication device. The communication device includes: at least one processor; and a memory communicatively connected to the at least one processor, where the memory stores an instruction executable by the at least one processor, and the instruction enables the at least one processor to execute the method for sharing a measurement gap according to the example of the first aspect of the disclosure or the method for sharing a measurement gap according to the example of the second aspect of the disclosure when executed by the at least one processor.

An example of a fourth aspect of the disclosure provides a non-transitory computer storage medium. The computer storage medium stores a computer-executable instruction, where the computer-executable instruction is capable of implementing the method for sharing a measurement gap according to the example of the first aspect of the disclosure or the method for sharing a measurement gap according to the example of the second aspect of the disclosure after executed by a processor.

BRIEF DESCRIPTION OF THE DRAWINGS

FIG. 3 is a schematic flow diagram of another method for sharing a measurement gap according to an example of the disclosure;

FIG. 4 is another schematic scheduling diagram of an SSB and a CSI-RS under a measurement gap according to an example of the disclosure;

FIG. 5 is a schematic flow diagram of yet another method for sharing a measurement gap according to an example of the disclosure;

FIG. 6 is a schematic structural diagram of an apparatus for sharing a measurement gap according to an example of the disclosure;

FIG. 7 is a schematic structural diagram of another apparatus for sharing a measurement gap according to an example of the disclosure; and FIG. 8 is a schematic diagram of a communication device according to an example of the disclosure.

DETAILED DESCRIPTION

Figures 1, 2:
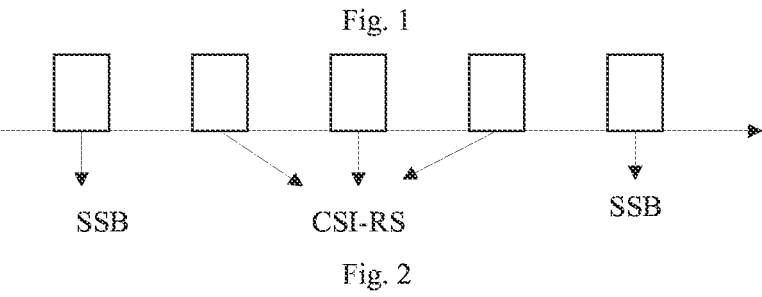
FIG. 1 is a schematic flow diagram of a method for sharing a measurement gap according to an example of the disclosure.
FIG. 2 is a schematic scheduling diagram of a synchronization signal block (SSB) and a channel state information reference signal (CSI-RS) under a measurement gap according to an example of the disclosure.

Examples of the disclosure will be described in detail below. Instances of the examples are shown in accompanying drawings, throughout which identical or similar reference numerals denote identical or similar elements, or elements having identical or similar functions. The examples described with reference to the accompanying drawings are illustrative and only intended to explain the disclosure, instead of being construed as limiting the disclosure.

The disclosure relates to the field of mobile communication, and particularly relates to a method for sharing a measurement gap, a communication device, and a storage medium.

Thus, the disclosure provides a method for sharing a measurement gap, a communication device, and a storage medium.

In the related art, a measurement gap mechanism for a mobility measurement of neighboring cells is defined. The UE can measure the neighboring cells according to a measurement gap configured by a network device. That is, in the measurement gap, the UE transmits or receives no data in a cell where it currently stays, and measures a neighboring cell by tuning a receiver to a frequency point of a neighboring cell. It switches back to the cell where it currently stays at the end of the measurement gap. During implementation, in a radio resource control_CONNECTED (RRC_CONNECTED) state, the UE can conduct mobility measurement on the neighboring cell on the basis of a synchronization signal block (SSB) and a channel state information reference signal (CSI-RS).

FIG. 1 is a schematic flow diagram of a method for sharing a measurement gap according to an example of the disclosure. The method is performed by a user equipment (UE) side. As shown in FIG. 1, the method for sharing a measurement gap includes the following steps:

S101, on the basis of a measurement gap sharing mechanism, mobility measurement is performed on a target frequency point with a target measurement mode in response to overlap of resource windows corresponding to all measurement modes.

Alternatively, all the measurement modes may include a first measurement mode and a second measurement mode, and the first measurement mode and the second measurement mode are different, such as the first measurement mode may be a synchronization signal block (SSB) or any other measurement modes of performing mobility measurement on a specified frequency point, and the second measurement mode may be a channel state information reference signal (CSI-RS) or any other measurement modes of performing mobility measurement on a specified frequency point. In the example of the disclosure, detailed description is performing with the SSB and the CSI-RS as examples. It is to be noted that the description is only illustrative and cannot be regarded as a specific limitation on the measurement mode.

A resource window corresponding to the SSB may be an SSB based radio resource management (RRM) measurement timing configuration (SMTC) window allocated to UE by a network device. Accordingly, a resource window corresponding to the CSI-RS may a CSI-RS based measurement timing configuration window allocated to the UE by the network device.

The target frequency point is a frequency point to be measured, which is determined by the UE according to configuration information. The target frequency point may correspond to a neighboring cell, or a plurality of neighboring cells, which is not limited by the example of the disclosure.

In the example of the disclosure, so as to perform mobility measurement of the target frequency point with various measurement modes by configuring measurement gap sharing mechanisms of all measurement modes, such that user equipment (UE) may obtain a suitable cell for handover.

In the example of the disclosure, under the condition that the network device configures mobility measurement based on the SSB and the CSI-RS for the target frequency point and the resource window corresponding to the SSB and the resource window corresponding to the CSI-RS, in order to perform mobility measurement of the target frequency point with two measurement modes based on the SSB and the CSI-RS overlap, the gap sharing mechanism may be configured for the UE through the network device or protocol agreement, and the configured gap sharing mechanism is transmitted to the UE.

Alternatively, the network device may configure a mobility measurement mode of the target frequency point for the UE through signaling for configuring a measurement gap, for instance, IE MeasConfig signaling. That is, the measurement configuration signaling carries a target frequency point to be measured, which is configured for the UE, and a corresponding measurement mode.

Accordingly, under the condition of determining, on the basis of obtained measurement gap configuration signaling transmitted from the network device, that the target frequency point is a mobility measurement frequency point based on the SSB and the CSI-RS and the resource window corresponding to the SSB and the resource window corresponding to the CSI-RS, the UE needs to determine opportunities of the SSB and the CSI-RS overlap to occupy the resource window on the basis of the measurement gap sharing mechanism when performing mobility measurement on the target frequency point.

In some possible embodiments, the measurement configuration signaling may include a target frequency point, a corresponding mobility measurement mode, and a resource window corresponding to each mobility measurement mode. In some other possible embodiments, the measurement configuration signaling may include a plurality of target frequency points, a mobility measurement mode corresponding to each target frequency point, and a resource window corresponding to each mobility measurement mode. In some other possible embodiments, the measurement configuration signaling may include a plurality of target frequency points, a configuration mode of a mobility measurement mode, and a resource window corresponding to each mobility measurement mode, that is, the plurality of target frequency points correspond to the same mobility measurement mode.

Alternatively, the measurement gap sharing mechanism may include first indication information configured to indicate a resource window sharing mode of the two target frequency point mobility measurement modes based on the SSB and the CSI-RS.

For instance, in the measurement gap sharing mechanism, a piece of indication information X is set to indicate an opportunity of the target frequency point mobility measurement mode based on the SSB to occupy a measurement gap resource window. Accordingly, (1-X) may indicate an opportunity of the target frequency point mobility measurement mode based on the CSI-RS to occupy the measurement gap resource window.

Alternatively, a value of a parameter in the above measurement gap sharing mechanism may be set as required. For instance, X may be 0.2, 0.25, 0.5, 0.75, 0.8, 1, etc. X=0.25 indicates that the opportunity of the target frequency point mobility measurement mode based on the SSB to occupy 25% of the measurement gap resource window is 25%. Accordingly, the opportunity of the measurement mode based on the CSI-RS to occupy the measurement gap resource window is 75%.

Alternatively, in the measurement gap sharing mechanism, a parameter X is set to indicate an opportunity of the target frequency point mobility measurement mode based on the CSI-RS to occupy a measurement gap resource window. Accordingly, (1-X) may indicate an opportunity of the target frequency point mobility measurement mode based on the SSB to occupy the measurement gap resource window.

Alternatively, in the measurement gap sharing mechanism, a parameter X may be set to indicate an opportunity of the target frequency point mobility measurement mode based on the CSI-RS to occupy a measurement gap resource window. Meanwhile, a parameter Y may be set to indicate an opportunity of the target frequency point mobility measurement mode based on the SSB to occupy the measurement gap resource window, where $X+Y<=1$.

It may be understood that the above mode of the measurement gap sharing mechanism is only illustrative and cannot be regarded as a limitation on the protection scope of the disclosure.

Alternatively, the above measurement gap sharing mechanism may be determined by the UE on the basis of received signaling for sharing a measurement gap transmitted from the network device. The signaling for sharing a measurement gap may be IE MeasGapSharingConfig. A field of the first indication information of the measurement gap sharing mechanism, for instance, MeasGapSharingScheme, may be added to the measurement gap sharing signaling, such that the resource window sharing mode of the two target frequency point mobility measurement modes based on the SSB and the CSI-RS may be indicated to the UE.

Alternatively, a value of the field MeasGapSharingScheme in the signaling for sharing a measurement gap may be a coded value corresponding to the above parameter X, or (1-X), or Y.

For instance, if the value of the field MeasGapSharingScheme is the coded value corresponding to the parameter X, and a value of X may be 0, 0.25, 0.5, or 0.75, a correspondence between the field MeasGapSharingScheme and X may be as shown in Table 1:

TABLE 1

| measGapSharingScheme | X (%) |
| --- | --- |
| 00 | 0 |
| 01 | 25 |
| 10 | 50 |
| 11 | 75 |

It may be understood that each element and each correspondence in Table 1 are present independently. The elements and correspondences are illustratively listed in the same table, but it is not indicated that all the elements and all the correspondences in the table have to be present at the same time as shown in Table 1. A value of each element and each correspondence are independent of any other value of elements or correspondence in Table 1. Thus, those skilled in the art may understand that the value of each element and each correspondence in Table 1 are independent examples.

In some possible embodiments, on the basis of the measurement gap sharing mechanism, the UE first determines the proportion of using the measurement gap by each measurement mode, then determines the target measurement mode to be used currently according to the proportion of using the measurement gap by each measurement mode and the number of times of each measurement mode that is performed, and further performs mobility measurement on the target frequency point with the target measurement mode.

For instance, in the above Table 1, the parameter X indicates the opportunity of the target frequency point mobility measurement mode based on the SSB to occupy the measurement gap resource window, and (1-X) indicates the opportunity of the target frequency point mobility measurement mode based on the CSI-RS to occupy the measurement gap resource window. Accordingly, according to the measurement gap sharing mechanism, the UE may determine the target measurement mode to be used under different measurement gap opportunities, and further perform mobility measurement on the target frequency point with the target measurement mode.

For instance, when the field MeasGapSharingScheme is "01", the UE determines that a ratio of the opportunity of the measurement mode based on the SSB to occupy the measurement gap resource window to the opportunity of the measurement mode based on the CSI-RS to occupy the measurement gap resource window is 1:3. In this way, a scheduling diagram of measurement by the UE on the basis of the SSB or the CSI-RS under different measurement gap opportunities may be shown in FIG. 2. That is, after performing mobility measurement on the target frequency point once on the basis of the SSB in each measurement gap, the UE needs to perform mobility measurement on the target frequency point three times on the basis of the CSI-RS in three subsequent measurement gaps.

Further, the UE may select a suitable cell for handover on the basis of signal quality measured with the target measurement mode.

In the example of the disclosure, in the measurement gap, if the resource windows corresponding to all the measurement modes overlap with each other, the UE may determine the current target measurement mode on the basis of the measurement gap sharing mechanism, and further perform mobility measurement on the target frequency point with the target measurement mode. In this way, mobility measurement of the target frequency point with various measurement modes sharing the resource window is performed without adding measurement resources, such that the UE may obtain a more suitable cell for handover under any conditions.

An example of the disclosure provides another method for sharing a measurement gap. FIG. 3 is a schematic flow diagram of another method for sharing a measurement gap according to an example of the disclosure. The method is executed by UE. As shown in FIG. 3, the method for sharing a measurement gap includes the following steps:

S301, in response to received signaling for configuring a measurement gap transmitted from a network device, it is determined that a target frequency point is a mobility measurement frequency point based on an SSB and a CSI-RS, and a resource window corresponding to the SSB and a resource window corresponding to the CSI-RS overlap.

In the example of the disclosure, a specific embodiment of the measurement configuration signaling may be any one of the embodiments of the example of the disclosure, which is not limited by the example of the disclosure and will not be repeated here.

S302, signaling for sharing a measurement gap transmitted from the network device is received, where the signaling for sharing a measurement gap includes a measurement gap sharing mechanism.

In a possible embodiment, the measurement gap sharing mechanism may include a proportion of occupying a measurement resource window by each measurement mode. In another possible embodiment, the measurement gap sharing mechanism may include a proportion of occupying the measurement gap by each measurement mode and execution sequence information of each measurement mode.

For instance, a value of a field MeasGapSharingScheme in the signaling for sharing a measurement gap is configured to indicate a proportion of occupying the measurement gap by an SSB measurement mode. Accordingly, the signaling for sharing a measurement gap further includes second indication information configured to indicate an execution sequence of the SSB measurement mode. When the second indication information has different values, it is indicated that the execution sequence of the SSB measurement mode is different. For instance, if the value of the second indication information is 0, it is indicated that the SSB measurement mode is executed first in the measurement gap. If the value of the field is 1, it is indicated that a CSI-RS measurement mode is executed first in the measurement gap.

Alternatively, a value of a field MeasGapSharingScheme in the signaling for sharing a measurement gap is configured to indicate a proportion of occupying the measurement gap by a CSI-RS measurement mode. Accordingly, the signaling for sharing a measurement gap further includes second indication information configured to indicate an execution sequence of the CSI-RS measurement mode. When the second indication information has different values, it is indicated that the execution sequence of the CSI-RS measurement mode is different. For instance, if the value of the second indication information is 0, it is indicated that the CSI-RS measurement mode is executed first in the measurement gap. If the value of the second indication information is 1, it is indicated that the SSB measurement mode is executed first in the measurement gap.

Alternatively, the second indication information configured to indicate the execution sequence of the CSI-RS measurement mode in the signaling for sharing a measurement gap corresponds to a plurality of fields. For instance, if a value of the plurality of fields is 01, it is indicated that execution sequences of the SSB and the CSI-RS are alternate, and alternatively, if a value of the plurality of fields is 11, it is indicated that mobility measurement based on the CSI-RS is executed once after the mobility measurement based on the SSB is executed every two times.

It is to be noted that the above description of the number and the values of the fields corresponding to the second indication information configured to indicate the execution sequence of the SSB and/or the CSI-RS is only illustrative, and cannot be regarded as a limitation on the protection scope of the disclosure.

In addition, in the example of the disclosure, a specific embodiment of the signaling for sharing a measurement gap and the measurement gap sharing mechanism may be any one of the embodiments of the example of the disclosure, which is not limited by the example of the disclosure and will not be repeated here.

S303, on the basis of the measurement gap sharing mechanism, execution sequence information of each measurement mode and a proportion of using the measurement gap by each measurement mode are determined.

S304, a target measurement mode to be used currently is determined according to the execution sequence information of each measurement mode, the proportion of using the measurement gap by each measurement mode and the number of times of each measurement mode that is executed.

S305, mobility measurement is performed on the target frequency point with the target measurement mode.

For instance, if the value of the field MeasGapSharing-Scheme in the measurement gap sharing mechanism is "10", it is indicated that the proportion of occupying the measurement gap by the SSB measurement mode is 50%. That is, an opportunity of a target frequency point mobility measurement mode based on the CSI-RS to occupy a measurement gap resource window is 50%. If a value of a field configured to indicate an execution sequence of the SSB is 1 in the gap sharing mechanism, it is indicated that mobility measurement based on the SSB is executed first according to the measurement gap opportunity.

A corresponding scheduling diagram of measurement by the UE on the basis of the SSB or the CSI-RS under different measurement gap opportunities may be as shown in FIG. 4. That is, in each measurement gap, the UE needs to perform mobility measurement on the target frequency point twice on the basis of the SSB, and then perform mobility measurement on the target frequency point twice on the basis of the CSI-RS, and so on.

Further, after performing mobility measurement on the target frequency point on the basis of the target measurement mode, the UE may select a suitable cell for handover on the basis of signal quality.

In the example of the disclosure, the UE receives the signaling for configuring a measurement gap transmitted from the network device, determines that the target frequency point is the mobility measurement frequency point based on the SSB and the CSI-RS and the resource window corresponding to the SSB and the resource window corresponding to the CSI-RS overlap, then determines the current target measurement mode on the basis of the execution sequence and the proportion of each measurement mode in the received measurement gap sharing mechanism transmitted from the network device, and further performs mobility measurement on the target frequency point with the target measurement mode. In this way, mobility measurement of the target frequency point with the two modes of the SSB and the CSI-RS sharing the resource window is performed flexibly without adding measurement resources, such that the UE may obtain a more suitable cell for handover under any conditions.

An example of the disclosure provides yet another method for sharing a measurement gap. FIG. 5 is a schematic flow diagram of yet another method for sharing a measurement gap according to an example of the disclosure. The method is executed by a network device. As shown in FIG. 5, the method for sharing a measurement gap includes the following steps:

S501, a measurement gap sharing mechanism is transmitted to UE, where the measurement gap sharing mechanism is configured to indicate a method for sharing a measurement gap between all measurement modes when the UE measures a target frequency point.

Alternatively, all the above measurement modes may include an SSB, a CSI-RS, and any other measurement modes of performing mobility measurement on the target frequency point, which are not limited by the disclosure.

In a possible embodiment, the network device may transmit the measurement gap sharing mechanism to the UE on the basis of signaling for sharing a measurement gap. That is, the signaling for sharing a measurement gap includes the measurement gap sharing mechanism.

Alternatively, the measurement gap sharing mechanism may include first indication information configured to indicate a proportion of using the measurement gap by each measurement mode.

Alternatively, the measurement gap sharing mechanism may further include second indication information configured to indicate an execution sequence of each measurement mode.

It is to be noted that in the example of the disclosure, a specific embodiment of the signaling for sharing a measurement gap and the measurement gap sharing mechanism may be any one of the embodiments of the example of the disclosure, which is not limited by the example of the disclosure and will not be repeated here.

Alternatively, the network device may further indicate a target frequency point to be measured, each measurement mode corresponding to the target frequency point, and a resource window corresponding to each measurement mode to the UE through a signaling for configuring a measurement gap.

Alternatively, if any target frequency point may perform mobility measurement on the basis of the SSB and the CSI-RS and resource windows of the SSB and the CSI-RS overlap each other, the network device may transmit signaling for configuring a measurement gap to the UE, where the signaling for configuring is configured to instruct the UE to perform mobility measurement on the target frequency point on the basis of the SSB and the CSI-RS, and indicate that the resource window corresponding to the SSB and the resource window corresponding to the CSI-RS overlap.

It is to be noted that in the example of the disclosure, a specific embodiment of the signaling for configuring a measurement gap instruction may be any one of the embodiments of the example of the disclosure, which is not limited by the example of the disclosure and will not be repeated here.

In the example of the disclosure, the network device transmits the measurement gap sharing mechanism to the UE, and further the UE performs mobility measurement on the target frequency point capable of undergoing mobility measurement according to various measurement modes. In this case, if the resource windows corresponding to all the measurement modes overlap with each other, the current target measurement mode may be determined on the basis of the measurement gap sharing mechanism, and further mobility measurement may be performed on the target frequency point with the target measurement mode. In this way, mobility measurement of the target frequency point with various measurement modes sharing the resource window is performed without adding measurement resources, such that the UE may obtain a more suitable cell for handover under any conditions.

Corresponding to the method for sharing a measurement gap according to the above several examples, the disclosure further provides the apparatus for sharing a measurement gap. Since the apparatus for sharing a measurement gap according to the example of the disclosure corresponds to the method for sharing a measurement gap according to the above examples of FIGS. 1-5, the embodiments of the method for sharing a measurement gap are also applicable to the apparatus for sharing a measurement gap according to the example, which will not be described in detail in the example.

FIG. 6 is a schematic structural diagram of an apparatus for sharing a measurement gap according to an example of the disclosure.

As shown in FIG. 6, the apparatus 600 for sharing a measurement gap is performed by UE and includes: a measurement module 610.

The measurement module 610 is configured to perform, on the basis of a gap sharing mechanism, mobility measurement on a target frequency point with a target measurement mode in response to overlap of resource windows corresponding to all measurement modes.

Alternatively, all the measurement modes may include a first measurement mode and a second measurement mode, and the first measurement mode and the second measurement mode are different, such as the first measurement mode may be an SSB or any other measurement modes of performing mobility measurement on a specified frequency point, and the second measurement mode may be a CSI-RS or any other measurement modes of performing mobility measurement on a specified frequency point. In the example of the disclosure, detailed description is performed with the SSB and the CSI-RS as examples. It is to be noted that the description is only illustrative and cannot be regarded as a specific limitation on the measurement mode.

Alternatively, the apparatus 600 for sharing a measurement gap further includes:

a reception module configured to receive signaling for sharing a measurement gap send by a network device, where the signaling for sharing a measurement gap includes the measurement gap sharing mechanism.

Alternatively, the apparatus 600 for sharing a measurement gap further includes:

a determination module configured to determine, in response to received signaling for configuring a measurement gap transmitted from the network device, that the target frequency point is a mobility measurement frequency point based on the SSB and the CSI-RS, and a resource window corresponding to the SSB and a resource window corresponding to the CSI-RS overlap.

Alternatively, the measurement module 610 may be specifically configured to:

determine, on the basis of the measurement gap sharing mechanism, a proportion of using the measurement gap by each measurement mode;

determine the target measurement mode to be used currently according to the proportion of using the measurement gap by each measurement mode and the number of times of each measurement mode that is performed; and perform mobility measurement on the target frequency point with the target measurement mode.

Alternatively, the measurement module 610 may be further specifically configured to:

determine, on the basis of the measurement gap sharing mechanism, execution sequence information of each measurement mode and the proportion of using the measurement gap by each measurement mode;

determine the target measurement mode to be used currently according to the execution sequence information of each measurement mode, the proportion of using the measurement gap by each measurement mode and the number of times of each measurement mode that is performed; and perform mobility measurement on the target frequency point with the target measurement mode.

In the example of the disclosure, in the measurement gap, if the resource windows corresponding to all the measurement modes overlap with each other, the UE may determine the current target measurement mode on the basis of the measurement gap sharing mechanism, and further perform mobility measurement on the target frequency point with the target measurement mode. In this way, mobility measurement of the target frequency point with various measurement modes sharing the resource window is performed without adding measurement resources, such that the UE may obtain a more suitable cell for handover under any conditions.

FIG. 7 is a schematic structural diagram of another apparatus for sharing a measurement gap according to an example of the disclosure.

As shown in FIG. 7, the apparatus 700 for sharing a measurement gap is performed by a network device and includes: a transmission module 710.

The transmission module 710 is configured to transmit a measurement gap sharing mechanism to user equipment (UE), where the measurement gap sharing mechanism is configured to indicate a method for sharing a measurement gap between all measurement modes when the UE measures a target frequency point.

Alternatively, all the measurement modes include a synchronization signal block (SSB), a channel state information reference signal (CSI-RS), and any other measurement modes of performing mobility measurement on a specified frequency point.

Alternatively, the transmission module 710 may be specifically configured to:

transmit signaling for sharing a measurement gap to the UE, where the signaling for sharing a measurement gap includes the measurement gap sharing mechanism.

Alternatively, the transmission module 710 may be further configured to:

transmit signaling for configuring a measurement gap to the UE, where the signaling for configuring is configured to instruct the UE to perform mobility measurement on the target frequency point on the basis of a synchronization signal block (SSB) and a channel state information reference signal (CSI-RS), and indicate that a resource window corresponding to the SSB and a resource window corresponding to the CSI-RS overlap.

Alternatively, the measurement gap sharing mechanism includes first indication information configured to indicate a proportion of using the measurement gap by each measurement mode.

Alternatively, the measurement gap sharing mechanism further includes second indication information configured to indicate an execution sequence of each measurement mode.

In the example of the disclosure, the network device transmits the measurement gap sharing mechanism to the UE, and further the UE performs mobility measurement on the target frequency point capable of undergoing mobility measurement according to various measurement modes. In this case, if the resource windows corresponding to all the measurement modes overlap with each other, the current target measurement mode may be determined on the basis of the measurement gap sharing mechanism obtained, and further mobility measurement may be performed on the target frequency point with the target measurement mode. In this way, mobility measurement of the target frequency point with various measurement modes sharing the resource window is performed without adding measurement resources, such that the UE may obtain a more suitable cell for handover under any conditions.

According to an example of the disclosure, the disclosure further provides a communication device and a readable storage medium.

As shown in FIG. 8, the communication device includes: one or more processors 1100, a memory 1200, and interfaces configured to connect all components, which include a high-speed interface and a low-speed interface. All the components are connected to one another with different buses, and may be mounted on a common mainboard or in other ways as required. The processor may process instructions executed in the communication device, which include instructions stored in or on the memory so as to display graphical information of a graphical user interface (GUI) on an external input/output apparatus (such as a display device coupled to the interface). In other embodiments, a plurality of processors and/or a plurality of buses may be used with a plurality of memories if required. Similarly, a plurality of communication devices may be connected, and each device provides some necessary operations (for instance, serving as a server array, a group of blade servers, or a multiprocessor system). In FIG. 8, a processor 1100 is taken as an example.

The memory 1200 is a non-transitory computer-readable storage medium according to the disclosure. The memory stores an instruction executable by at least one processor, so as to enable the at least one processor to execute a method for measuring a neighboring cell according to the disclosure. The non-transitory computer-readable storage medium according to the disclosure stores a computer instruction. The computer instruction is configured to enable a computer to execute the method for measuring a neighboring cell according to the disclosure.

As a non-transitory computer-readable storage medium, the memory 1200 may be configured to store a non-transitory software program, a non-transitory computer-executable program, and modules, such as program instructions/modules (for instance, a measurement module 610 as shown in FIG. 6, or a transmission module 710 as shown in FIG. 7) corresponding to the method for sharing a measurement gap according to the example of the disclosure. The processor 1100 executes various functional applications and data processing of a server by running the non-transitory software program, the instruction and the modules stored in the memory 1200, that is, implements the method for measuring a neighboring cell according to the above method example.

The memory 1200 may include a program storage area and a data storage area, where the program storage area may store an operating system and an application required for at least one function; and the data storage area may store data, etc. created according to usage of a positioning communication device. Moreover, the memory 1200 may include a high-speed random access memory, and may further include a non-volatile memory, for instance, at least one magnetic disk memory device, a flash memory device, or other non-volatile solid-state memory devices. Alternatively, the memory 1200 may include a memory remotely arranged with respect to the processor 1100, and the remote memory may be connected to the positioning communication device by means of a network. Instances of the network include, but are not limited to, the Internet, enterprise intranets, local area networks, mobile communication networks, and combinations of the above.

The communication device may further include: an input apparatus 1300 and an output apparatus 1400. The processor 1100, the memory 1200, the input apparatus 1300 and the output apparatus 1400 may be connected by means of buses or in other ways. In FIG. 8, bus connection is taken as an example.

The input apparatus 1300 may receive input digital or character information and generate key signal input related to user settings and function control of the positioning communication device, for instance, a touch screen, a keypad, a mouse, a track pad, a touch pad, an indication rod, one or more mouse buttons, a trackball, a joystick, and other input apparatuses. The output apparatus 1400 may include a display device, an auxiliary lighting apparatus (for instance, a light emitting diode (LED)), a tactile feedback apparatus (for instance, a vibration motor), etc. The display device may include, but is not limited to, a liquid crystal display (LCD), a light emitting diode (LED) display, and a plasma display. In some embodiments, the display device may be a touch screen.

Various embodiments of the systems and technologies described here may be implemented in a digital electronic circuit system, an integrated circuit system, an application-specific integrated circuit (ASIC), computer hardware, firmware, software, and/or their combinations. All the embodiments may include: an implementation in one or more computer programs, which may be executed and/or interpreted on a programmable system including at least one programmable processor, and the programmable processor may be a special-purpose or general-purpose programmable processor and capable of receiving and transmitting data and instructions from and to a storage system, at least one input apparatus, and at least one output apparatus.

Computation programs (also called programs, software, software applications, or codes) include a machine instruction of a programmable processor, and may be implemented by using high-level processes and/or object-oriented programming languages, and/or assembly/machine languages. As used here, the terms "machine-readable medium" and "computer-readable medium" refer to any computer program product, device, and/or apparatus (for instance, a magnetic disk, an optical disk, a memory, a programmable logic device (PLD)) configured to provide a machine instruction and/or data for a programmable processor, including a machine-readable medium receiving a machine instruction as a machine-readable signal. The term "machine-readable signal" refers to any signal configured to provide a machine instruction and/or data for a programmable processor.

In order to provide interaction with a user, the systems and technologies described here may be implemented on a computer. The computer has: a display apparatus (for instance, a cathode ray tube (CRT) or a liquid crystal display (LCD) monitor) configured to display information to the user; and a keyboard and a pointing apparatus (for instance, a mouse or a trackball), through which the user may provide input for the computer. Other types of apparatuses may also provide interaction with the user. For instance, feedback provided for the user may be any form of sensory feedback (for instance, visual feedback, auditory feedback, or tactile feedback); and input from the user may be received in any form, including acoustic input, voice input, or tactile input.

The systems and technologies described here may be implemented in a computing system (for instance, as a data server) including a background component, or a computing system (for instance, an application server) including a middleware component, or a computing system (for instance, a user computer having a graphical user interface or a web browser through which a user may interact with the embodiments of the systems and technologies described here) including a front-end component, or a computing system including any combination of such background components, middleware components, or front-end components. The components of the system may be connected to each other through digital data communication in any form or medium (for instance, a communication network). Instances of the communication network include: a local area network (LAN), a wide area network (WAN), and the Internet.

A computer system may include a client and a server. The client and the server are generally far away from each other and typically interact with each other through a communication network. A relation between the client and the server is generated by computer programs running on corresponding computers and having a client-server relation with each other.

In the example of the disclosure, in a measurement gap, if a resource window corresponding to an SSB and a resource window corresponding to a CSI-RS overlap, UE may determine a current target measurement mode on the basis of a measurement gap sharing mechanism obtained, and further conduct mobility measurement on a target frequency point with the target measurement mode. In this way, mobility measurement of the target frequency point with two modes of the SSB and the CSI-RS sharing the resource window is conducted without adding measurement resources, such that the UE may obtain a more suitable cell for handover under any conditions.

Those of ordinary skill in the art may understand that all or some steps in the method according to the above examples may be implemented by instructing related hardware by a program. The program may be stored in a computer-readable storage medium. When the program is executed, one or a combination of the steps of the method example is included.

In addition, all functional units in each of the examples of the disclosure may be integrated into a processing module, or may be independently and physically present, and alternatively, two or more units may be integrated into a module. The above integrated module may be implemented in a form of hardware or a software functional module. If the integrated module is implemented in the form of the software functional module and sold or used as an independent product, the integrated module may be stored in a computer-readable storage medium.

The above-mentioned storage medium may be a read only memory, a magnetic disk, an optical disk, etc.

An example of a first aspect of the disclosure provides a method for sharing a measurement gap. The method is performed by user equipment (UE) and includes:

performing, on the basis of a measurement gap sharing mechanism, mobility measurement on a target frequency point with a target measurement mode in response to overlap of resource windows corresponding to all measurement modes.

In an implementation, the method further includes:

receiving signaling for sharing a measurement gap transmitted from a network device, where the signaling for sharing a measurement gap includes the measurement gap sharing mechanism.

In an implementation, the method further includes:

determining, in response to received signaling for configuring a measurement gap transmitted from a network device, that the target frequency point is a mobility measurement frequency point based on a synchronization signal block (SSB) and a channel state information reference signal (CSI-RS), and a resource window corresponding to the SSB and a resource window corresponding to the CSI-RS overlap.

In an implementation, where the conducting, on the basis of a measurement gap sharing mechanism obtained, mobility measurement on a target frequency point with a target measurement mode includes:

determining, on the basis of the measurement gap sharing mechanism, a proportion of using the measurement gap by each measurement mode;

determining the target measurement mode to be used currently according to the proportion of using the measurement gap by each measurement mode and the number of times of each measurement mode that is performed; and performing mobility measurement on the target frequency point with the target measurement mode.

In an implementation, where the conducting, on the basis of a measurement gap sharing mechanism obtained, mobility measurement on a target frequency point with a target measurement mode includes:

determining, on the basis of the measurement gap sharing mechanism, execution sequence information of each measurement mode and the proportion of using the measurement gap by each measurement mode;

determining the target measurement mode to be used currently according to the execution sequence information of each measurement mode, the proportion of using the measurement gap by each measurement mode and the number of times of each measurement mode that is performed; and performing mobility measurement on the target frequency point with the target measurement mode.

An example of a second aspect of the disclosure provides a method for sharing a measurement gap. The method is performed by a network device and includes:

transmitting a measurement gap sharing mechanism to user equipment (UE), where the measurement gap sharing mechanism is configured to indicate the method for sharing a measurement gap between all measurement modes when the UE measures a target frequency point.

In an implementation, where the transmitting a measurement gap sharing mechanism to user equipment (UE) includes:

transmitting signaling for sharing a measurement gap to the UE, where the signaling for sharing a measurement gap includes the measurement gap sharing mechanism.

In an implementation, the method further includes:

transmitting signaling for configuring a measurement gap to the UE, where the signaling for configuring a measurement gap is configured to instruct the UE to conduct mobility measurement on the target frequency point on the basis of a synchronization signal block (SSB) and a channel state information reference signal (CSI-RS), and indicate that a resource window corresponding to the SSB and a resource window corresponding to the CSI-RS overlap.

In an implementation, where the measurement gap sharing mechanism includes first indication information configured to indicate a proportion of using the measurement gap by each measurement mode.

In an implementation, where the measurement gap sharing mechanism further includes second indication information configured to indicate an execution sequence of each measurement mode.

An example of a third aspect of the disclosure provides an apparatus for sharing a measurement gap. The apparatus is performed by UE and includes:

a measurement module configured to conduct, on the basis of a measurement gap sharing mechanism, mobility measurement on a target frequency point with a target measurement mode in response to overlap of resource windows corresponding to all measurement modes.

An example of a fourth aspect of the disclosure provides an apparatus for sharing a measurement gap. The apparatus is performed by a network device and includes:

a transmission module configured to transmit a measurement gap sharing mechanism to user equipment (UE), where the measurement gap sharing mechanism is configured to indicate a method for sharing a measurement gap between all measurement modes when the UE measures a target frequency point.

What are described above are merely the preferred embodiments of the disclosure. It is to be noted that those of ordinary skill in the art can also make some improvements and modifications without departing from the principle of the disclosure, and these improvements and modifications should also fall within the protection scope of the disclosure.

The invention claimed is:

1. A method for sharing a measurement gap, performed by user equipment (UE), the method comprising:

receiving a signaling for sharing the measurement gap sent by a network device, wherein the signaling for sharing the measurement gap comprises a measurement gap sharing mechanism, the measurement gap sharing mechanism comprises first indication information configured to indicate a proportion of the measurement gap used by a first measurement mode and a second measurement mode, the first measurement mode and the second measurement mode are two different methods for performing a mobility measurement on a target frequency point, the target frequency point corresponds to a neighboring cell, or a plurality of neighboring cells;

when a first resource window corresponding to the first measurement mode and a second resource window corresponding to the second measurement mode overlap, performing the mobility measurement on the target frequency point with a target measurement mode, according to the measurement gap sharing mechanism;

wherein performing the mobility measurement on the target frequency point with the target measurement mode, according to the measurement gap sharing mechanism comprises:

determining, based on the measurement gap sharing mechanism, a proportion of the measurement gap used by each measurement mode;

determining the target measurement mode according to the proportion of the measurement gap used by each measurement mode and a number of times of each measurement mode that is performed; and performing the mobility measurement on the target frequency point with the target measurement mode.

2. The method according to claim 1, further comprising:

when receiving a signaling for configuring the measurement gap transmitted from the network device, determining that the target frequency point is a mobility measurement frequency point based on a synchronization signal block (SSB) and a channel state information reference signal (CSI-RS), and a resource window corresponding to the SSB and a resource window corresponding to the CSI-RS overlap.

3. The method according to claim 1, wherein performing the mobility measurement on the target frequency point with the target measurement mode, according to the measurement gap sharing mechanism comprises:

determining, based on the measurement gap sharing mechanism, execution sequence information of each measurement mode and the proportion of the measurement gap used by each measurement mode;

wherein determining the target measurement mode according to the proportion of the measurement gap used by each measurement mode and the number of times of each measurement mode that is performed comprises:

determining the target measurement mode according to the execution sequence information of each measurement mode, the proportion of the measurement gap used by each measurement mode and the number of times of each measurement mode that is performed.

4. A method for sharing a measurement gap, performed by a network device, the method comprising:

transmitting the measurement gap sharing mechanism to user equipment (UE), wherein the measurement gap sharing mechanism is configured to indicate the method for sharing a measurement gap between a first measurement mode and a second measurement mode when the UE measures a target frequency point;

wherein transmitting the measurement gap sharing mechanism to the UE comprises:

transmitting a signaling for sharing the measurement gap to the UE, wherein the signaling for sharing the measurement gap comprises the measurement gap sharing mechanism, the measurement gap sharing mechanism comprises first indication information configured to indicate a proportion of the measurement gap used by the first measurement mode and the second measurement mode, the first measurement mode and the second measurement mode are two different methods for performing a mobility measurement on the target frequency point, the target frequency point corresponds to a neighboring cell, or a plurality of neighboring cells.

5. The method according to claim 4, further comprising:

transmitting a signaling for configuring the measurement gap to the UE, wherein the signaling for configuring the measurement gap is configured to instruct the UE to perform the mobility measurement on the target frequency point based on a synchronization signal block (SSB) and a channel state information reference signal (CSI-RS), and indicate that a resource window corresponding to the SSB and a resource window corresponding to the CSI-RS overlap.

6. The method according to claim 4, wherein the measurement gap sharing mechanism further comprises second indication information configured to indicate an execution sequence of each measurement mode.

7. A communication device, comprising: a transceiver; a memory; and a processor, which is connected to the transceiver and the memory separately and configured to control the transceiver to receive and transmit a radio signal by executing a computer-executable instruction on the memory, and the processor implements:

receiving a signaling for sharing a measurement gap sent by a network device, wherein the signaling for sharing the measurement gap comprises a measurement gap sharing mechanism, the measurement gap sharing mechanism comprises first indication information configured to indicate a proportion of the measurement gap used by a first measurement mode and a second measurement mode, the first measurement mode and the second measurement mode are two different methods for performing a mobility measurement on a target frequency point, the target frequency point corresponds to a neighboring cell, or a plurality of neighboring cells;

when a first resource window corresponding to the first measurement mode and a second resource window corresponding to the second measurement mode overlap, performing the mobility measurement on the target frequency point with a target measurement mode, according to the measurement gap sharing mechanism;

wherein the processor further implements:

determining, based on the measurement gap sharing mechanism, a proportion of the measurement gap used by each measurement mode;

determining the target measurement mode according to the proportion of the measurement gap used by each measurement mode and a number of times of each measurement mode that is performed; and performing the mobility measurement on the target frequency point with the target measurement mode.

8. The communication device according to claim 7, wherein the processor further implements:

when receiving a signaling for configuring the measurement gap transmitted from the network device, determining that the target frequency point is a mobility measurement frequency point based on a synchronization signal block (SSB) and a channel state information reference signal (CSI-RS), and a resource window corresponding to the SSB and a resource window corresponding to the CSI-RS overlap.

9. The communication device according to claim 7, wherein the processor further implements:

determining, based on the measurement gap sharing mechanism, execution sequence information of each measurement mode and the proportion of the measurement gap used by each measurement mode;

wherein determining the target measurement mode according to the proportion of the measurement gap used by each measurement mode and the number of times of each measurement mode that is performed comprises:

determining the target measurement mode according to the execution sequence information of each measurement mode, the proportion of the measurement gap used by each measurement mode and the number of times of each measurement mode that is performed.

* * * * *